United States Patent [19]

Reese, Sr.

[11] 4,087,954
[45] May 9, 1978

[54] RETRACTABLE CROP GATHERING FINGER CONSTRUCTION

[76] Inventor: Arthur Reese, Sr., Rte. 2, Goodhue, Minn. 55027

[21] Appl. No.: 695,194

[22] Filed: Jun. 11, 1976

[51] Int. Cl.² .......................................... A01D 45/02
[52] U.S. Cl. ......................................... 56/119; 56/314
[58] Field of Search ......................... 56/119, 314–320, 56/312

[56] References Cited

U.S. PATENT DOCUMENTS

| 2,352,257 | 6/1944 | Dray ........................................ 56/119 |
| 2,701,434 | 2/1955 | Christopherson ................. 56/314 X |
| 3,959,958 | 6/1976 | Bontrager ............................ 56/314 |

FOREIGN PATENT DOCUMENTS

| 257,962 | 5/1949 | Switzerland ........................... 56/314 |

Primary Examiner—Jay N. Eskovitz
Attorney, Agent, or Firm—Williamson, Bains, Moore & Hansen

[57] ABSTRACT

Telescopingly retractable crop gathering finger means for agricultural harvesting apparatus, and apparatus equipped with same. In a preferred embodiment the finger means comprises an elongated, tubular housing adapted to be attached to a harvester frame and a rigid, retractable finger which is telescopingly received within the housing. The finger is normally biased in a fully extended, outwardly projecting position by spring means disposed internally of the housing, and is adapted to slide along the ground to pick up downed crops. In response to predetermined excess forces encountered by the finger, it will automatically retract internally of the housing thereby escaping damage. An aperture in the housing may be provided to selectively lock the finger in a fully retracted position internally of the housing where desired by the operator.

1 Claim, 5 Drawing Figures

U.S. Patent May 9, 1978 4,087,954
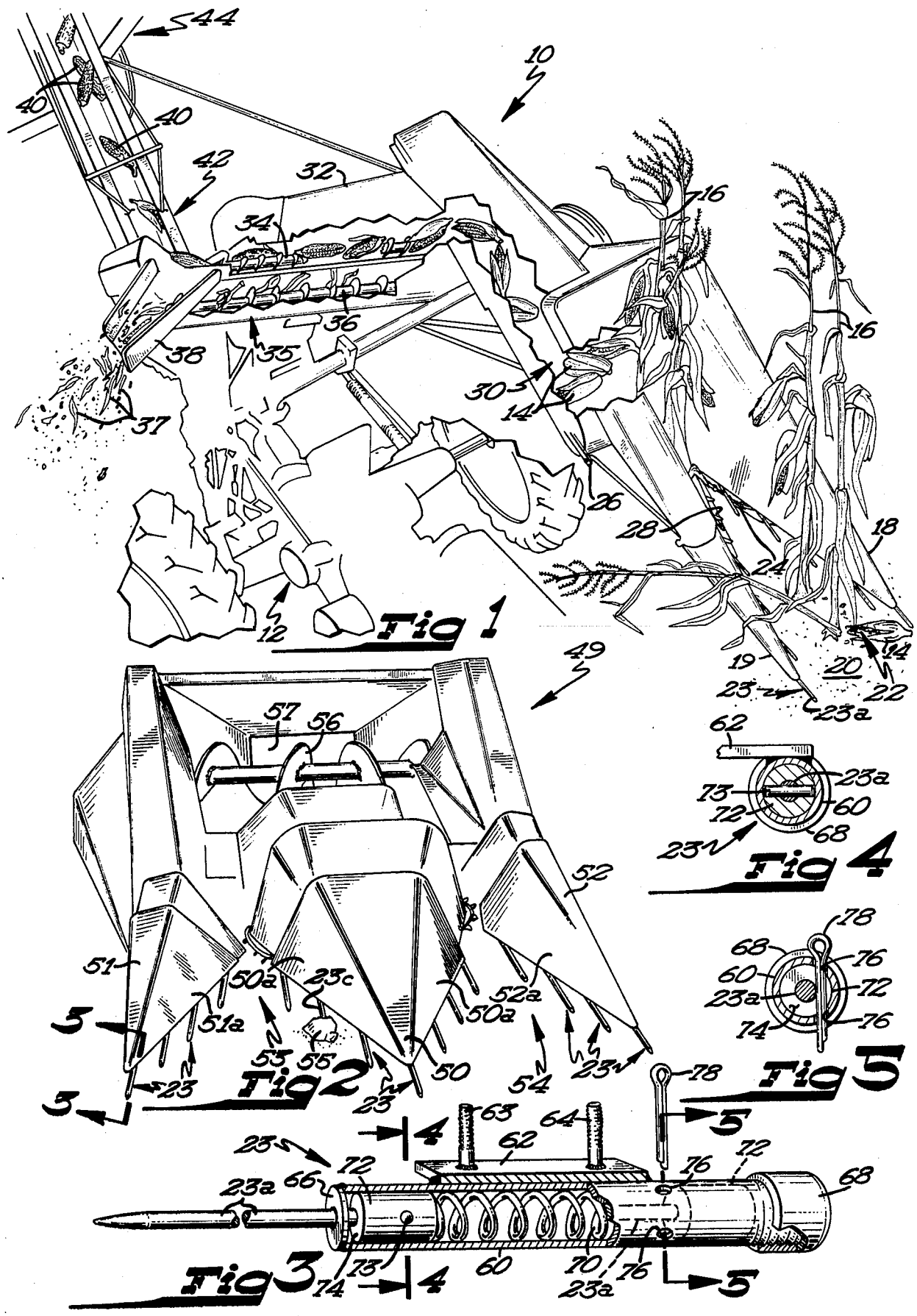

RETRACTABLE CROP GATHERING FINGER CONSTRUCTION

BACKGROUND OF THE INVENTION

This invention relates to agricultural harvesting apparatus. More particularly, the present invention relates to crop gathering finger construction for harvester apparatus having a portion thereof closely abutting the ground for gathering crops.

Prior art corn harvesters often include some form of finger structure to gather corn stalks (or other material to be harvested) lying on the ground or slightly depressed therewithin. A corn harvester, for example, typically includes a plurality of gatherer sections which lie horizontally on opposite sides of the corn row to gather corn stalks and urge them rearwardly into the associated mechanical processing apparatus. Where corn stalks are lying on the ground or slightly depressed they will often be passed over and lost unless some form of gathering fingers are employed in conjunction with the apparatus to run along the ground. As will be recognized by those skilled in the art, crops can be thrown to the ground by high winds, hail, or other weather conditions, or by animals passing through the field.

An example of the prior art is shown in U.S. Pats. Nos. 1,860,633, and 1,833,137, issued to H. Synck on May 31, 1932, and Nov. 24, 1931, respectively. These latter references disclose harvesting apparatus including downwardly angled members for engaging the ground to help dislodge downed corn. U.S. Pat. No. 1,878,941, issued Sept. 20, 1932, to A. Lindgren discloses a plurality of resilient, spring-biased steel finger members which project forwardly from spaced apart gatherer members at the front of the harvester. U.S. Pat. No. 2,601,305, issued to K. Laun on June 24, 1952, is similar in scope to the latter references. In U.S. Pat. No. 1,956,676, issued to R. Grey et al. on May 1, 1934, a plurality of spaced apart spring-biased metallic fingers are shown.

One problem often associated with prior art gatherer finger construction is that when a rock or other hard obstacle, for example, is encountered, the fingers may be broken or badly bent. Accordingly, it has been attempted in the prior art to provide some form of deflectable finger construction. This is somewhat suggested by the latter Grey U.S. Pat. No. 1,956,676 reference. U.S. Pat. No. 2,816,412, issued Dec. 17, 1957, to A. Fisher discloses a grain lifter in which a downwardly angled member is pivotally attached to the under surface of a harvester apparatus to prevent damage by simply yieldably pivoting away in response thereto. Where a large rock is encountered, however, damage may still occur where the finger is unable to pivot entirely out of the way. Moreover, even flexible resilient fingers may eventually be worn out or broken as a result of continual bending and twisting.

SUMMARY OF THE INVENTION

The present invention comprises a telescopingly retractable, product gathering finger adapted to project forwardly from a harvester along the ground. An elongated, rigid tubular frame housing receives a retractable finger, which is telescopingly received therewithin. Spring means within the tubular frame normally biases the gatherer finger outwardly to a ground-engaging, forwardly projecting position. However, in response to predetermined forces generated by, for example, a rock or other obstacle, the finger will be urged inwardly to a retracted position within the housing, thereby escaping damage. In a preferred form of the invention an aperture is provided in the housing means whereby the finger may be selectively secured in a fully retracted position. The corn picker described and claimed herein includes a plurality of fingers constructed as mentioned above to continually pick up corn or other product to be harvested lying on the ground and/or slightly buried therein.

Thus, an object of this invention is to provide crop gatherer apparatus for use with harvesting machines which will be highly resistant to physical damage.

A further object of this invention is to provide a crop gathering finger apparatus in which a forwardly projecting finger portion will be entirely retractable to completely hide itself in a safe position in response to large rigid obstacles.

A still further object of this invention is to provide a corn picker finger of the character described which may be manually maintained in a retracted position where desired by the operator. To this effect, it is a feature of this invention that aperture key lock means are provided to maintain the finger in a retracted position.

A still further object of this invention is to provide a corn picker employing a plurality of fingers of the character described whereby downed product (i.e. corn stalks) lying on the ground which would otherwise be lost will be continuously gathered as the corn harvester is moved through the stalks of corn.

A similar object of this invention is to provide agricultural harvesting apparatus with gathering finger construction which is highly resistant to ordinarily encountered obstacles such as rocks or the like.

These and other objects and advantages of this invention, along with features of novelty apertinent thereto, will appear or become apparent in the course of the following detailed description.

BRIEF DESCRIPTION OF THE DRAWINGS

In the following drawings, which form a part of the specification and are to be construed in conjunction therewith, and in which like reference numerals have been employed throughout to indicate like parts in the various views:

FIG. 1 is a perspective view of an agricultural crop harvesting implement incorporating the teachings of this invention, with parts thereof shown diagrammatically for clarity;

FIG. 2 is a front elevational view of a two row corn harvester gatherer section employing the teachings of the instant invention;

FIG. 3 is a side elevational view of a retractable crop gatherer finger constructed in accordance with the teachings of this invention, and with parts thereof broken away or shown in sections for clarity;

FIG. 4 is a cross-sectional view of the retractable finger apparatus taken generally through line 4—4 of FIG. 3; and FIG. 5 is a cross-sectional view taken generally through line 5—5 of FIG. 3.

DETAILED DESCRIPTION OF THE DRAWINGS

In FIG. 1 there is seen a crop harvesting apparatus 10 which is adapted to be towed by a conventional tractor 12, illustrated diagrammatically. Harvester 10 comprises a one row corn picker which is adapted to harvest ears of corn 14 from vertical, upwardly growing corn stalks 16. It will be understood that the teachings of this invention will be of equal applicability in conjunction with agricultural apparatus for harvesting other crops such as potatoes, grain, soybeans or the like.

The corn picker 10 comprises a forwardly projecting pair of flexible gatherer points 18 and 19 which follow the contour of the ground 20 and lie on opposite sides of a row of corn (or other product) 22. Finger structures 23 project forwardly from the gatherer points 18 and 19. The function of the tapered gatherer points is to raise the stalks 16 of corn as the apparatus moves down the row and to prevent ears of corn from being whipped off and lost. Gatherer point hinges 26 enable the gatherer sections to flex in response to uneven ground. Downed and twisted stalks are guided to conventional snapping rolls 28, which snap off the ears 14 of corn and deliver them to a first elevator 30 through which they are conveyed upwardly (as viewed in FIG. 1) and delivered to a generally transversely extending, conventional husking box 32. The husking box includes an auger 34 for drawing the ears through the box and for facilitating the removal of husks therewithin. Husks and trash that have been drawn through the box will be conveyed through the lower portion 35 thereof via an auger 36 which conveys husks and trash 37 to an output chute 38. Shelled corn 40 enters an elevator conveyer 42 and is conveyed to a hopper or storage wagon 44.

In FIG. 2 there is illustrated a twin row corn picker gatherer section comprising a centrally located, forwardly tapered gatherer point or corn head 50 and a pair of somewhat smaller cooperating gatherer points or corn heads 51 and 52 at opposite sides of the central gatherer 50. A pair of input mouths 53 and 54 defined between gatherer points 50, 51 and 52 will alignably engage parallel, spaced apart rows of corn. As the apparatus 49 is drawn through the field stalks of corn will be deflected inwardly of mouths 53 and 54 and processed through auger 56 and through related machinery and apparatus (not shown). As in the case of apparatus 10, the plurality of ground-engaging crop gathering structures 23 project forwardly from the gatherer sections 50 through 52. Finger 23c has been retracted in response to rock 55.

Each of the finger structures 23 are mounted on the lower portions of the gatherers 50 through 52 and are slightly angled so that the forward tipped portion thereof glide along and engage the ground. As the apparatus 49 is drawn through the field, ears of corn (or other product) lying on the ground or slightly depressed therein will be dislodged and picked up by the fingers so that they may be moved into mouths 53 or 54. Therefore product lying on the ground will be recovered. The finger structures 23 will actually provide an upwardly lifting action on corn stalks, for example, so that they will be deflected into mouths 54 or 54 by contacting the sheet metal wall portions 50a through 52a of the gatherer sections.

Referring now to FIGS. 3 through 5, the retractable crop gathering finger apparatus 23 preferably comprises an elongated, rigid tubular frame housing member 60 which is adapted to be mounted to the underside of a harvester apparatus (such as machine 10 or 49) by a laterally outwardly projecting side plate 62. Plate 62 may be attached to housing 60 by welding or the like. A pair of upwardly extending anchor screws 63 and 64 may be conventionally bolted to mounting holes (now shown) at the underside of the harvester on which the finger apparatus is to be mounted. A toroidal-shaped end cap 66 is secured at the forward end of housing 60 by welding or the like. A threaded cap 68 is threadably secured at the opposite end of housing 60, and secures an internally coiled spring 70 against rearward displacement within the housing 60.

The ground-engaging, forwardly projecting finger portion 23a is slidably received through a central orifice in end cap 66 and is securely anchored within a rigid, generally cylindrical plunger 72 by a pin 73. Plunger 72 is slidably disposed internally of the housing 60, and biased towards the left (as viewed in FIG. 3) by coiled spring member 70. It will be apparent that because of the action of spring 70 the finger portion 23a will be normally biased in an outwardly projecting position with respect to housing 60. However, as the finger encounters obstacles such as rocks or the like, in response to the movement of the harvester apparatus, it may be deflected inwardly with respect to the housing 60 against predetermined tension from spring 70. Therefore when encountering excess forces the finger member 23a will be telescopingly receiving within the housing 60 in an out-of-the-way, safe position. When the plunger is fully retracted the front shoulder portion 74 thereof will be positioned immediately adjacent a key aperture 76 provided near the opposite end of housing 60. A key or cotter pin 78 may be passed through aperture 76 to lock finger 23a in a recessed position internally of the housing. The pin 78 will abut plunger shoulder 74 to maintain the plunger and finger structure in a retracted, internal position. Therefore, where desired to lock the finger in the retracted position, the farmer need merely slidably telescope the finger into a recessed position internally of housing 60, and then simply drop pin 78 (or a nail or other object) through aperture 76 to maintain the plunger within the housing against a predetermined tension from spring 70. As long as the finger 23a is enclosed within the housing interiorly of the agricultural harvesting apparatus it will be immune from obstacles lying on the ground. When pin 78 is removed, spring 70 will immediately return finger portion 23a to the external operative position.

From the foregoing it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. In combination with a corn harvesting implement movable along a path and having a plurality of forwardly extending corn heads adapted to move along a row of corn stalks to guide and direct corn stalks toward processing apparatus associated with said implement, a plurality of crop gathering finger apparatuses to lift corn stalks lying on the ground and which would otherwise be missed by said implement, each said finger apparatus comprising:

a rigid, tubular, elongated housing having foward and rearward ends and having a cylindrical inner chamber with a central longitudinal axis, said housing being fixed relative to and carried by a said corn head with said central axis being generally aligned with the path of travel of said implement;

a finger portion including a forwardly projecting pointed finger and a cylindrical plunger portion fixed relative to said finger and slidably, telescopically mounted in said inner chamber for movement along and substantially parallel to said axis between an extended position, wherein said finger extends forwardly, outwardly from said housing, and a retracted position, wherein said finger is wholly within said housing, said chamber and said plunger portion cooperating to guide said finger portion and maintain said finger portion generally parallel to said axis to prevent movement of said finger portion transverse to said axis;

spring means within said chamber and contacting said finger portion and said housing to bias said finger portion toward said extended position and to return said finger portion from a retracted position to an extended position, permitting said finger to move inwardly from extended position toward retracted position when said finger strikes an obstruction on the ground so as to avoid damage to said apparatus;

said housing being mounted to said harvesting implement so that said finger when in said extended position moves along and closely follows the ground so that said pointed finger will slip under corn stalks lying on the ground and raise such stalks so that said harvesting heads can receive and recover such corn stalks;

each said finger portion including a shoulder portion;

each said housing including a transverse pin aperture through said chamber and positioned forwardly of said shoulder portion when said finger portion is in said retracted position; and each said finger apparatus further including a pin selectively, removably positioned in said pin aperture to keep said finger portion stored in said wholly retracted position when said finger is not needed for crop gathering.

* * * * *